United States Patent [19]

Henderson et al.

[11] Patent Number: 5,011,169
[45] Date of Patent: Apr. 30, 1991

[54] HUMAN POWER SHOPPING CART PROPULSION DEVICE

[76] Inventors: Harold Henderson, 3566 Whiporwill Dr., Austin, Mich. 48467; Larry Henderson, 1933 S. Pinnebog Rd., Bad Axe, Mich. 48413

[21] Appl. No.: 361,643

[22] Filed: Jun. 5, 1989

[51] Int. Cl.⁵ .................. B62K 7/00; B62K 27/12
[52] U.S. Cl. ..................... 280/202; 280/33.992; 280/DIG. 4
[58] Field of Search ............ 280/202, 33.991, 33.992, 280/287, DIG. 4, 87.1; 180/11

[56] References Cited

U.S. PATENT DOCUMENTS

| | | | |
|---|---|---|---|
| 2,482,585 | 9/1949 | Hauptman | 280/202 |
| 3,044,801 | 7/1962 | Vicany | 280/202 |
| 3,187,373 | 6/1965 | Fisher | 403/92 |
| 3,524,512 | 8/1970 | Voeks et al. | 280/33.991 |
| 3,575,250 | 4/1971 | Dykes | 280/33.992 |
| 3,807,760 | 4/1974 | Jordan | 280/218 |
| 4,096,920 | 6/1978 | Heyn | 280/DIG. 4 |
| 4,484,755 | 11/1984 | Houston | 280/33.992 |
| 4,770,431 | 9/1988 | Kulik | 280/202 |
| 4,771,840 | 9/1988 | Keller | 280/33.992 |
| 4,830,388 | 5/1989 | Wang | 280/202 |

FOREIGN PATENT DOCUMENTS

| | | | |
|---|---|---|---|
| 418054 | 11/1910 | France | 280/287 |
| 578428 | 7/1924 | France | 280/202 |
| 836062 | 10/1938 | France | 280/202 |
| 836258 | 10/1938 | France | 280/202 |
| 881761 | 2/1943 | France | 280/202 |
| 2484946 | 12/1981 | France | 280/202 |
| 2606357 | 5/1988 | France | 280/33.992 |
| 1904 | 1/1911 | United Kingdom | 280/202 |
| 482082 | 3/1938 | United Kingdom | 280/202 |

Primary Examiner—Mitchell J. Hill
Attorney, Agent, or Firm—Irving M. Weiner; Robert M. Petrik; Joseph P. Carrier

[57] ABSTRACT

A device for carrying a person and propelling a shopping cart. The device includes an easily detachable cross-bar for coupling a bicycle-like device to a shopping cart. The bicycle-like device includes a seat and pedals/sprocket assembly for propelling the shopping cart. The bicycle-like device includes dual rear wheels which enhances the stability and maneuverability of the coupled device.

4 Claims, 2 Drawing Sheets

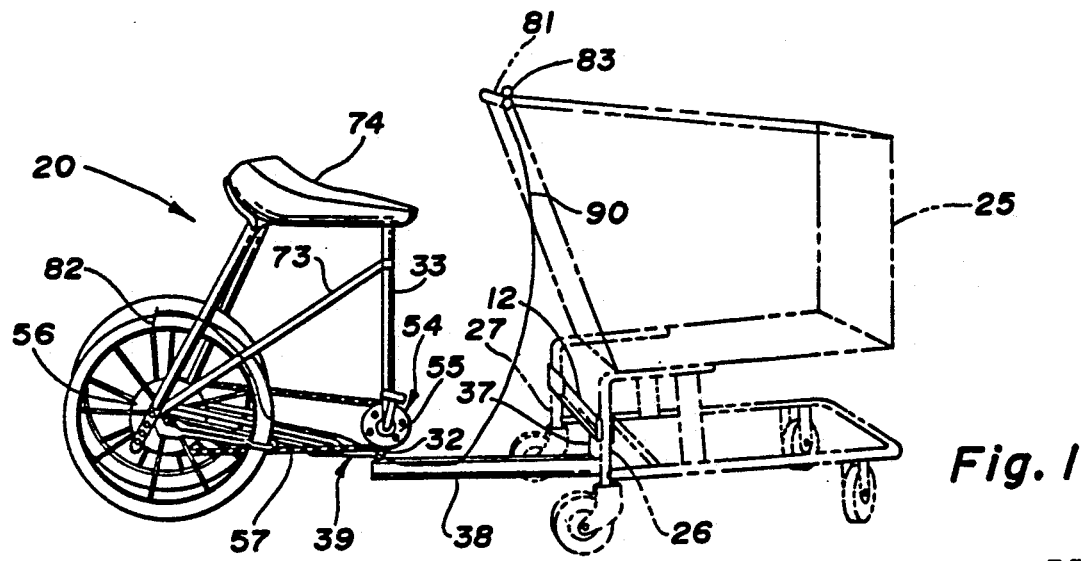
Fig. 1
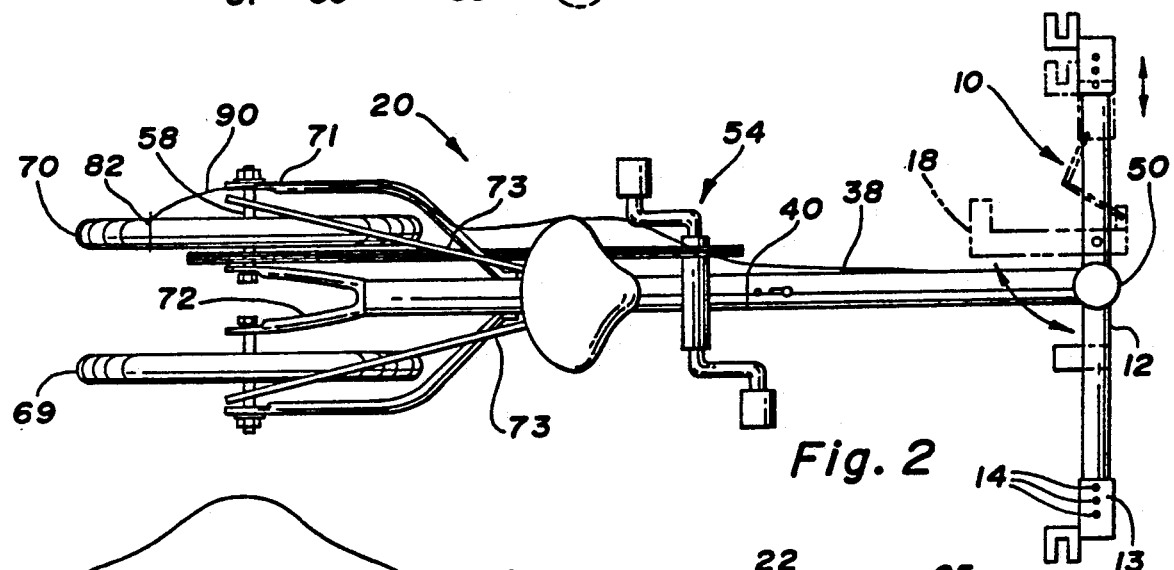
Fig. 2
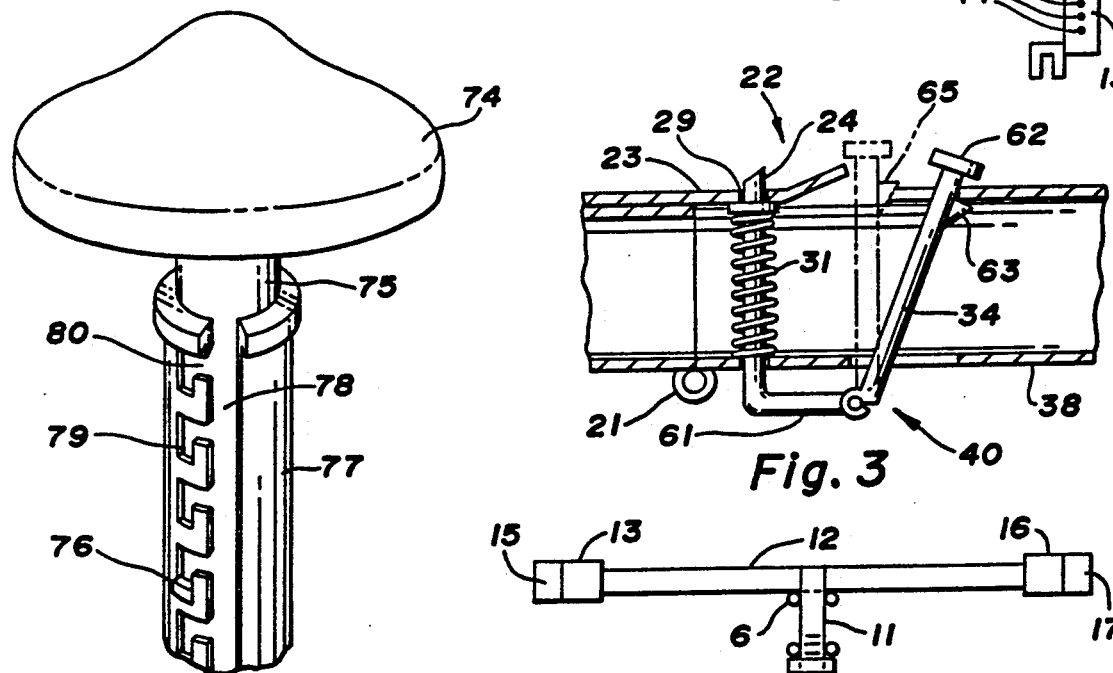
Fig. 3
Fig. 4
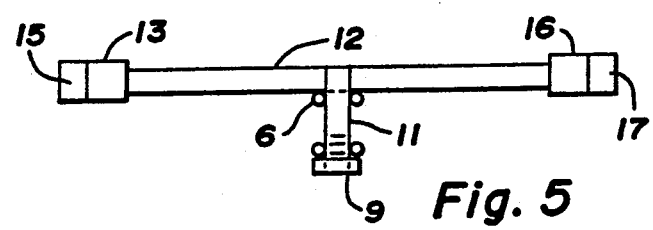
Fig. 5

HUMAN POWER SHOPPING CART PROPULSION DEVICE

BACKGROUND OF THE INVENTION

1. Field of the Invention

The present invention relates generally to devices that carry a person and propel a shopping cart. More particularly, the present invention relates to a pedal-powered, chain and sprocket driven, wheeled device that is selectively attachable to, and detachable from, ordinary shopping carts without modification to the shopping cart and without the use of tools.

2. Description of the Relevant Art

There have been several proposed devices for carrying a rider which will attach to a shopping cart. These devices employ a variety of steering, drive and attachment means. However, due to their motorized nature, such devices require electric storage batteries for power; making each device heavier, potentially more dangerous, and more expensive to operate than the present invention.

The proposed device closest in spirit to the present invention is disclosed by U.S. Pat. No. 4,771,840, issued in 1988 to Keller, which utilizes a shopping cart for steering purposes and carries a crossbar attachment assembly attachable to the shopping cart. Unlike the selectively attachable/detachable crossbar of the present invention, Keller discloses an attachment means fixably bolted to the shopping cart frame and utilizing a ball-joint type hitch means.

A human-propelled shopping cart device with provisions for a rider are exemplified by U.S. Pat. No. 4,484,755 issued in 1984 to Houston and U.S. Pat. No. 3,044,801 issued in 1962 to Vicany. Houston discloses a special cart attachable to ordinary motive devices such as wheelchairs or walkers. Thus, this device is opposite that of the present invention which provides a special motive device for attachment to an ordinary shopping cart. Vicany discloses an extended shopping cart frame having a pedal drive system, a steering tiller for turning a rear wheel, and an attached seat.

An electric vehicle for attachment to shopping carts is disclosed in U.S. Pat. No. 3,575,250 issued in 1971 to Dykes. Dykes includes a crossbar which attaches between the rear wheels of a shopping cart.

An electric cart for lifting shopping carts is disclosed in U.S. Pat. No. 3,524,512 issued in 1970 to Voeks et al. Voeks et al. provides a single connection to the shopping cart by lifting the rear wheels of the shopping cart with the front end of the electric cart.

An electric shopping cart with a riding platform is disclosed in U.S. Pat. No. 4,096,920 issued in 1978 to Fleyn.

The present invention includes features which are not taught by the above-mentioned relevant art. These features include a human-powered shopping cart propulsion device with an adjustable seat which is capable of being selectively attached and detached to various size shopping carts without the use of tools.

SUMMARY OF THE INVENTION

The present invention provides a human powered shopping cart propulsion device capable of being secured to various size shopping carts, and detached therefrom, without the use of tools. The invention features a device having a wheeled propulsion unit utilizing pedals, with attached chain and sprocket direct drive, thus providing forward or reverse motion. The unit also has an adjustable seat to accommodate various sized riders.

A foldable yoke connects the propulsion unit to an adjustable length crossbar. The crossbar has an attached mounting post. The yoke of the propulsion unit has a sleeve which receives the mounting post. A nut is provided to secure the sleeve-to-mounting post connection. The mounting post carries at least one set of bearings to provide an easily pivotable connection between the sleeve and mounting post. The crossbar is then press fit to a shopping cart frame by lever action thus frictionally engaging mounting brackets to the cart. The unit is then steered by using the shopping cart handle in the manner of handlebars. A conventional brake mechanism is provided for the wheels of the propulsion unit.

BRIEF DESCRIPTION OF THE DRAWINGS

FIG. 1 illustrates a perspective view of the device in accordance with the present invention.

FIG. 2 illustrates a top view of the device in accordance with the present invention.

FIG. 3 illustrates a hinge pin in accordance with the present invention.

FIG. 4 illustrates an adjustable seat in accordance with the present invention.

FIG. 5 illustrates an end view of the crossbar in accordance with the present invention.

Figure 6A:
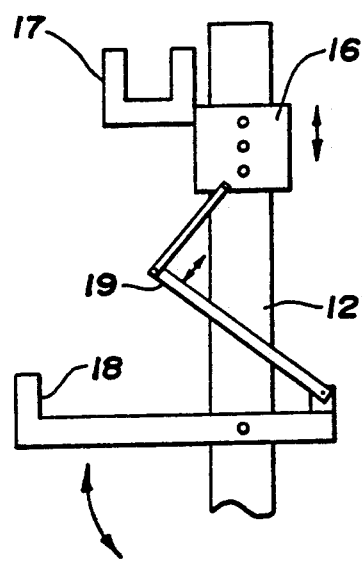
FIGS. 6a and 6b illustrate the mechanism for extending a crossbar in accordance with the present invention.

It is an object of the present invention to provide a highly maneuverable and stable pedal-powered shopping cart.

DETAILED DESCRIPTION OF THE PREFERRED EMBODIMENTS

The present invention includes two main assemblies, an adjustable crossbar assembly 10 and a human powered propulsion assembly 20. These two assemblies connect together at pivot point 30. Crossbar assembly 10 connects to a shopping cart 25 (shown in phantom) as will be described later in greater detail. The shopping cart 25 acts as the forward wheels and steering mechanism for the present invention.

Crossbar Assembly

As shown in FIGS. 2 and 5, crossbar assembly 10 has a central support member 12. Fixed at the center of support member 12 and extending perpendicularly downward therefrom is a bearing post 11. At the proximal and distal ends of the bearing post 11 are located bearing races holding ball bearings 6. The distal end of bearing post 11 is threaded to accept a retaining nut 9 below the distal bearing race.

On one side of support member 12, as seen in FIGS. 2 and 5, an adjustable attachment sleeve 13 is slidably received thereon. Attachment sleeve 13 is larger than support member 12 to fit thereon and is anchored in a selected position by placing a pin through one of the holes 14 in the attachment sleeve 13 and one of the corresponding holes in the support member 12. These holes are aligned down the longitudinal axes of support member 12 and attachment sleeve 13, to provide a range of suitable positions in which to anchor attachment sleeve 13 according to the width of the shopping cart to be attached. Attachment sleeve 13 has affixed thereto bracket 15 capable of substantially surrounding a shopping cart post 26. Preferably, but not necessarily, the bracket 15 is rubber lined so as to not damage the finish of the shopping cart post 26.

At the opposite end of the support member is a levered sleeve 16. Levered sleeve 16 fits over support member 12 and carries a bracket 17 in the manner of attachment sleeve 13 with the bracket 17 opening facing opposite that of bracket 15 in order that it may accept and surround the opposite side shopping cart post 27.

Figure 6B:
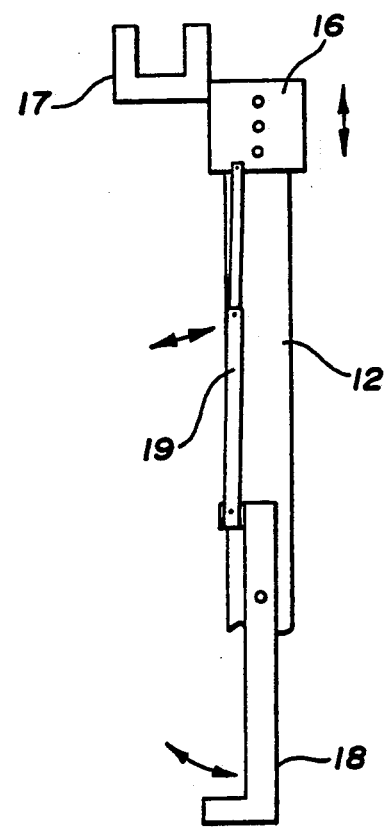

As best seen in FIGS. 6a and 6b, pivotally attached to the levered sleeve 16 at the proximal end thereof is a connecting arm 19. Connecting arm 19 is then pivotally attached at its opposite end to a L-shaped lever 18. Lever 18 is then pivotally attached to support member 12. As best shown in FIG. 2, rotation of lever 18 will cause connecting arm 19 to move from its engaged position parallel to the longitudinal axis of support member 12 to a disengaged position having an acute angle with the support member 12. This in turn draws lever sleeve 16 toward the center of support member 12 to disengage bracket 17 from shopping cart post 27.

In the preferred embodiment, it is envisioned that attachment sleeve 13 will be positioned so as to allow full extension of connecting arm 19 when lever sleeve 16 and its bracket 17 engage post 27. This will allow the long arm of L-shaped lever 18 to rest in an unobtrusive position paralleling support member 12. Preferably, but not necessarily, a latch 50 can secure the handle 18 in the engaged position.

Propulsion Assembly

Propulsion assembly 20 is connected to crossbar assembly 10 by placing yoke sleeve 37 over bearing post 11 and securing the connection with a retaining nut 9. Bearings 6 are provided to allow easy pivoting between yoke sleeve 37 and bearing post 11.

Yoke sleeve 37 is affixed to the forward end of yoke 38. Yolk 38 extends rearwardly from the yoke sleeve 37 approximately 25 inches to connect with propulsion frame 39. The yoke 38 is hinged at a point 40 close to the propulsion frame 39 allowing the yoke to be folded underneath the propulsion frame, for ease of storage. The yoke hinge 40 consists of a hinge plate 21 located on the underside of yoke 38 and a locking mechanism 22 located on the top side of yoke 38.

As best shown in FIG. 3, locking mechanism 22, preferably, but not necessarily, consists of a flange 23 having a hole 29 which receives a spring-loaded locking pin 24. Locking pin 24 is one upright of a U-bolt 61 contained generally within the central cavity of yoke 38, and is urged upwardly through the yoke 38 at rearward hole 29 by spring 31. The opposite upright of the U-bolt 61 has a flattened head 62 so that pressure may be applied downwardly thereon, disengaging a wedge 63 on opposite upright 34 from its receptor slot 65 allowing pin 24 to disengage from rearward hole 29 and flange 23. Both pin 24 and upright 34 are then moved frontwards to the disengaged position and held in position by wedge 63 pressing against yoke channel member 38.

At a point on the yoke, rearward of locking mechanism 22, is attached propulsion frame 39 including pedal-set frame member 32, which extends from seat tube 33. Pedal-set frame member 32 carries a crank and pedal set 54 such as is known in the bicycle art. Rotation of crank and pedal set 54 drives front sprocket 55. In the preferred embodiment, the front sprocket 55 is a 4½ inch diameter, 28 tooth sprocket.

Front sprocket 55 is connected to a rear sprocket 56 by chain 57. Preferably, but not necessarily, the rear sprocket is a 7 or 8 inch in diameter, and 46 or 48 tooth sprocket. It is envisioned that a number of different gear ratios could be used with the current invention. Rear sprocket 56 is connected directly to axle 58 which provides a direct drive, thereby providing for forward or reverse motive power. Wheels 69, 70 are preferably, but not exclusively, 16 inch diameter pneumatic wheels. The wheels are preferably mounted to propulsion frame 39 by chain stays 71 on their exterior sides and on their interior sides by a Y-shaped frame member 72 fixed to seat tube 33.

Seat stays 73 extend from chain stays 71 upwardly and forwardly to seat tube 33. At the top of seat tube 33 is located seat 74. Seat 74 is mounted on seat post 75 which has located on the post length a block 76 extending perpendicularly from the longitudinal axes of the seat post 75.

Seat tube 33 has inserted therein an inside cylinder 77 having a channel 78 communicating with cutout portions 79, forming bayonet sockets 80 to receive seat post block 76. This arrangement provides selectable bayonet receive seat post block 76. This arrangement provides selectable bayonet couplings between cylinder 77 and seat post 75 to adjust the seat height for various size operators. The range of seat height adjustment may be further increased by providing for positionable mounting of inside cylinder 77, as by set screws inserted through seat tube 33 to contact the inside cylinder 77.

In use the operator will make sure the yoke hinge 40 is in the locked position. The operator will then adjust attachment sleeve 13 to an effective width setting for the shopping cart used and fit bracket 15 to engage shopping cart post 26. Levered sleeve 16 is then moved to engage its bracket 17 with its opposite side shopping cart post 27. The seat is then adjusted to a comfortable height for the operator who steers the device by using a shopping cart handle 81 in the manor of handlebars. A control lever 83 for a conventional brake mechanism 82 including cable 90 for the device wheel 69, 70 may be detachably mounted on the shopping cart handle 81.

While the present invention has been illustrated and described in connection with preferred embodiments, it is not to be limited to the particular structure shown, because many variations thereof will be evident to one skilled in the art and are intended to be in compassed in the present invention as set forth in the following claims.

We claim:

1. A human-powered shopping cart propulsion device, comprising:
   a wheeled propulsion unit including pedals;
   a yoke which extends forwardly from said propulsion unit;
   an adjustable length crossbar means for attaching said yoke to a shopping cart;
   said adjustable length crossbar includes attachment members at each end adapted to engage a shopping cart post;
   one of said attachment members is attached to a levered sleeve;
   said levered sleeve is pivotally attached to a connecting arm;
   said connecting arm is pivotally attached to a lever pivotally attached to said crossbar; and
   rotation of said lever causes said levered sleeve to engage and disengage a shopping cart post.

2. A shopping cart attachment for providing motive force to a shopping cart comprising:
- a frame including a seat support and pedal sprocket assembly;
- at least one wheel supporting said frame and located rearwardly of said seat;
- a chain extending between said pedal sprocket assembly and an axle of said at least one wheel;
- attachment means for securing said frame to said shopping cart;
- said attachment means includes a yoke member extending forwardly of said seat and connected to said frame adjacent said pedal sprocket assembly;
- said yoke member is foldable to permit compact storage of said shopping cart attachment;
- said yoke member pivotally attached to a support member for attachment for a shopping cart;
- said support member includes brackets at each end; and
- each said bracket is adjustable along the length of said support member to accommodate different shopping carts.

3. The shopping cart attachment of claim 2, wherein:
said pedal sprocket assembly and chain establish a direct drive which provides forward and reverse motive power.

4. The shopping cart attachment of claim 2, wherein:
said brackets clampingly engage the shopping cart posts to securely attach said frame and yoke to said shopping cart.

* * * * *